United States Patent [19]
Hilke et al.

[11] Patent Number: 4,944,666
[45] Date of Patent: Jul. 31, 1990

[54] INJECTOR HEAD FOR PRODUCING TREAD STRIPS

[75] Inventors: Rainer Hilke, Starnberg; Gerhard Schmaderer, Cham, both of Fed. Rep. of Germany

[73] Assignee: A-Z Foremen- und Maschinenbau GmbH, Munich, Fed. Rep. of Germany

[21] Appl. No.: 395,938

[22] Filed: Aug. 18, 1989

[30] Foreign Application Priority Data

Aug. 18, 1988 [DE] Fed. Rep. of Germany ... 8810470[U]

[51] Int. Cl.$^5$ .............................................. B29C 47/16
[52] U.S. Cl. .................................. 425/131.1; 264/171; 264/177.16; 425/133.5; 425/140; 425/141
[58] Field of Search .................... 264/167, 171, 177.16; 425/130, 131.1, 133.5, 140, 141, 466

[56] References Cited

U.S. PATENT DOCUMENTS 2,720,679 10/1955 Ratliff .................................... 425/307
3,870,453 3/1975 Howard .............................. 425/466

Primary Examiner—Jay H. Woo
Assistant Examiner—Timothy W. Heitbrink
Attorney, Agent, or Firm—Robert W. Becker & Associates

[57] ABSTRACT

An injector head for producing tread strips, and including a thickness-adjusting slide and two side plates for forming an essentially trapezoidal tread strip profile. The side plates are mounted so as to be adjustable in a lateral direction, and are supported against the thickness-adjusting slide in a direction parallel to the direction of extrusion. The thickness-adjusting slide extends on the shorter side of the trapezoid over the entire width of the tread strip. Either the thickness-adjusting slide or the side plates are mounted on an injector head end member that can swivel away.

16 Claims, 4 Drawing Sheets

INJECTOR HEAD FOR PRODUCING TREAD STRIPS

BACKGROUND OF THE INVENTION

The present invention relates to an injector head for producing tread strips for tires, including a thickness-adjusting slide means and two side plates to form an essentially trapezoidal tread strip profile.

An injector head for producing tread strips and having adjustment capability for the tread strip profile has been known for a long time from U.S. Pat. No. 2,720,679. Such injector heads have a plurality of vertical slide means with which the thickness of the tread strip profile is supposed to be capable of being regulated at every point. In addition, this known construction provides a type of side gauge for adjusting the width of the tread strip profile, with the setting angle thereof additionally being adjustable, so that the extrusion angle of the sides or "wings", as they are also known, is adjustable.

This heretofore known injector head is not suitable for rapidly changing between different widths, as is necessary, for example, during the retreading of tires. In fact, a number of vertical slide means must be adjusted in order to be able to produce the new shape. The known construction is relatively expensive and susceptible to problems, and at the same time is not very precise, because the side gauges tend toward slight elastic deformations, depending upon the speed of extrusion. In addition, due to the side gauges, scrap rubber is always produced that can then be further processed only subsequently.

U.S. Pat. No. 3,870,453 furthermore discloses an injector head for producing tread strips that is characterized by a thickness-adjusting slide means that is adjustable in a single piece, and with which at the same time the width of the tread strip can be adjusted due to the essentially trapezoidal configuration of the tread strip profile, as well as the fact that the thickness-adjusting slide means is delivered from below, i.e. from the longer side of the trapezoid. However, this known injector head does not provide a fine adjustment capability, because the width and thickness of the tread strip profile are always simultaneously changed. Due to the enormous pressures in the chamber that is downstream from the extruder, a strong crossbeam is provided, and the thickness-adjusting slide means is supported by a special slide plate that can be swung away by a lever system if, for example, the injector head is to be cleaned. This heretofore known construction tends rather readily to tilt during displacement of the thickness-adjusting slide means. In addition, no possibility is provided for the coextrusion of bonding or carrier rubber.

In contrast, it is an object of the present invention to provide an injector head, for producing tread strips, of the aforementioned general type that combines great flexibility with a precise dimensioning of the tread strip profile, while at the same time being mechanically relatively inexpensive and uncomplicated.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
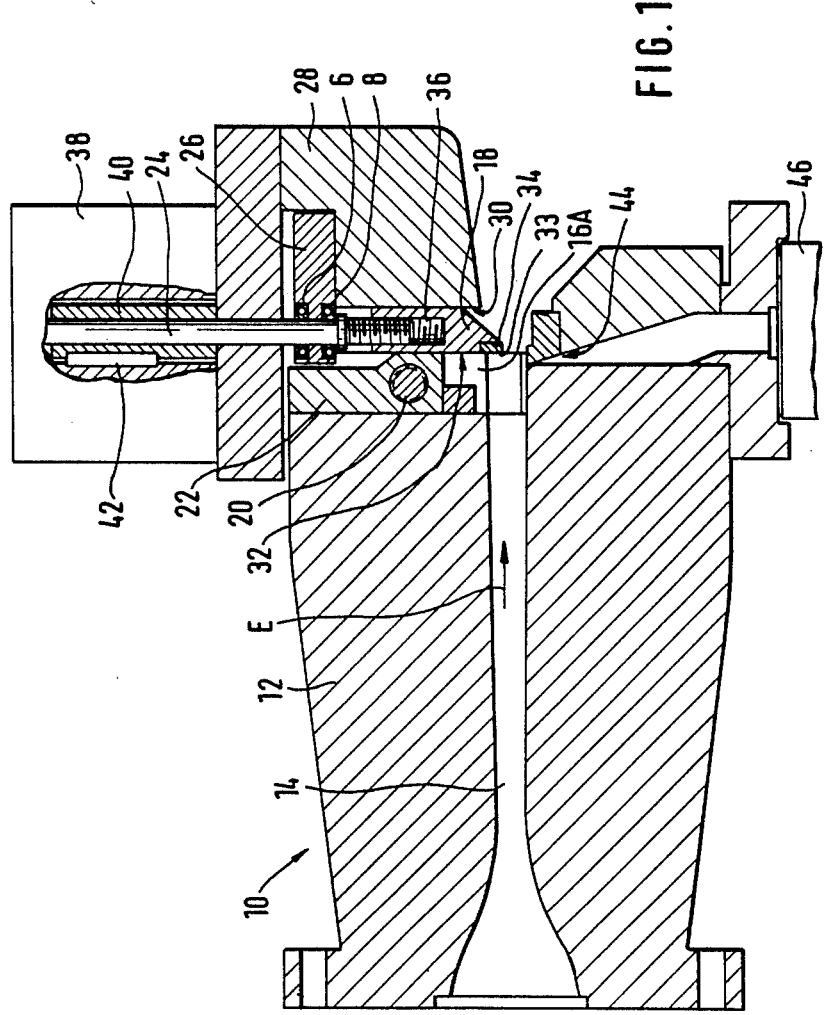
FIG. 1 is a cross-sectional view through one exemplary embodiment of an inventive injector head for producing tread strips.

The injector head of the present invention is characterized primarily by: means for mounting the side plates in such a way that the same are adjustable in a lateral direction, at right angles to the direction of extrusion, and are supported against the thickness-adjusting slide means in a direction parallel to the direction of extrusion, with the thickness-adjusting slide means, on the shorter side of the trapezoid, extending over the entire tread strip width; and an end member that is mounted on the injector head in such a way that it can swivel, with either the thickness-adjusting slide means or the two side plates being mounted on this end member.

A particularly advantageous feature of the present invention is that the side plates can be exposed in a very simple manner by pivoting away the end member of the injector head. Due to the fact that the side plates are merely placed upon separate adjustment members, the side plates can be very easily removed; however, they are nevertheless precisely and exactly guided when the end member of the injector head is swung shut. In so doing, the thickness-adjusting slide means then at the same time supports the upper portion of each side plate, which is very advantageous due to the enormous forces that result during rapid extrusion.

The engagement pressure at the same time also enhances the sealing effect, so that no separate seals have to be provided.

Furthermore, by pivoting or otherwise moving the extruder head end member away, the interior of the injector head is easily made accessible, thereby facilitating cleaning.

With the inventive arrangement of the thickness-adjusting slide means and the side plates it is in addition always possible to achieve optimum profiling of the tread strip and in particular at any desired dimensions. Appropriate profiling of the side plates assures that the wings do not extend out in a sharp point, but rather have small side surfaces that can then also be rounded off.

This design with cut-off ends of the wings is more advantageous for further processing.

As a result of the fact that the side plates are extended laterally to the outside, there is assured that the side plates can be supported on their outer lower ends even in the longest profile setting. Since the side plates are in addition supported at the inside/at the top on the thickness-adjusting slide means and at the same time a support in the vicinity of the adjustment member takes place, a stable three-point support over a large surface area exists that is suitable for the operating pressures that occur. In so doing, the thickness-adjusting slide means is in turn supported on the end member of the injector head, which is of appropriately strong construction.

The inventive arrangement offers the capability of being able to work with a simple manual adjustment, whereby even with manual adjustment the symmetry of the tread strip profile is always ensured. Furthermore, the servo-motors can be flanged on above the thickness-adjusting slide means as well as laterally of the threaded spindle that operates the adjustment members; with these motors, by means of a program, the various tire shapes and profiles can be set and recalled.

The present invention furthermore offers the simple capability of connecting on a coextruder that, for extruding carrier rubber on the bottom, acts upon the longer side of the trapezoid and, when viewed in the direction of extrusion, preferably opens out in the transition region between the thickness-adjusting slide means and the side plates. For this purpose, a known, slot-like wide nozzle that is combined with a conical preliminary chamber can be disposed downstream of the extruder worm, so that a uniform carrier rubber layer result s over the width of the tread strip.

It is also particularly advantageous if the threaded spindle or the adjustment members of the side plates are centrally supported on thrust bearing means, i.e. in the middle between the two adjustment members. This optimizes the setting tolerances, and always assures that a symmetrical configuration of the tread strip profile relative to the central axis of the main extruder results.

Further specific features of the present invention will be described in detail subsequently.

Description of Preferred Embodiments

Referring now to the drawings in detail, the inventive injector head 10 for producing tread strips is provided with an injector head body 12 in which is formed a main extruder channel 14 that extends centrally through the extruder head body 12 in a longitudinal direction. Inventively disposed at the mouth of the main extruder channel 14 is a combination of two side plates, one plate 16a of which is shown in FIG. 1, and a thickness-adjusting slide means 18. The side plate 16a is laterally adjustable via a threaded spindle 20, which is supported via a mounting block 22 that is secured to the injector head body 12. The thickness-adjusting slide means 18 is similarly displaceably supported via a threaded spindle 24 that in turn is supported via a further mounting block 26 on an end member 28 of the injector head, whereby this end member 28 can be pivoted away from the body 12 of the injector head. The threaded spindle 24 is guided in the mounting block 26 via thrust bearings 6, 8 that also provide support in the axial direction.

The end member 28 of the injector head furthermore has a support surface 30 for the thickness-adjusting slide means 18, while the side plate 16a is supported and precisely guided on a slide surface 32 of the thickness-adjusting slide means 18 remote from the support surface 30. When the injector head end member 28 is pivoted away, separation from the injector head body 12 occurs at the slide surface 32, so that the thickness-adjusting slide means 18 and the side plate 16a are separated from one another and are each exposed.

At its bottom end, the thickness-adjusting slide means 18 tapers conically counter to the direction of extrusion E, whereby an exchangeable guide facing 34 is secured to bottom working edge 33 that faces the direction of extrusion E.

The thickness-adjusting slide means 18 is furthermore provided with an internal thread 36 with which a corresponding external thread of the spindle 24 meshes. In order to assure as exact an adjustment possibility as possible, the internal thread 36 and the external thread of the spindle 24 are fine threads. The threaded spindle 24 extends upwardly to a servo-motor 38 with which it is connected via a sleeve 40 by means of a tongue and groove joint 42. The servo-motor 38 permits a very fine adjustment of the thickness-adjusting slide means 18, even against the forces that occur during extrusion. In particular, the servo-motor 38 permits a resolution of the order of magnitude of 0.1 mm.

Provided across from the thickness-adjusting slide means 18 is a mouth 44 of a coextruder 46, which has a split construction and extends over the entire working width of the side plates. When the side plates are set narrowly, it is particularly advantageous for corresponding parts of the mouth 44 to be covered by the side plates, so that at these locations no excess bonding or carrier rubber can be discharged. In so doing, the position of the mouth 44 is also indicated, because the latter is disposed in the transition region between the side plates 16 and the thickness-adjusting slide means 18, yet is still just slightly below the side plates.

Figure 2:
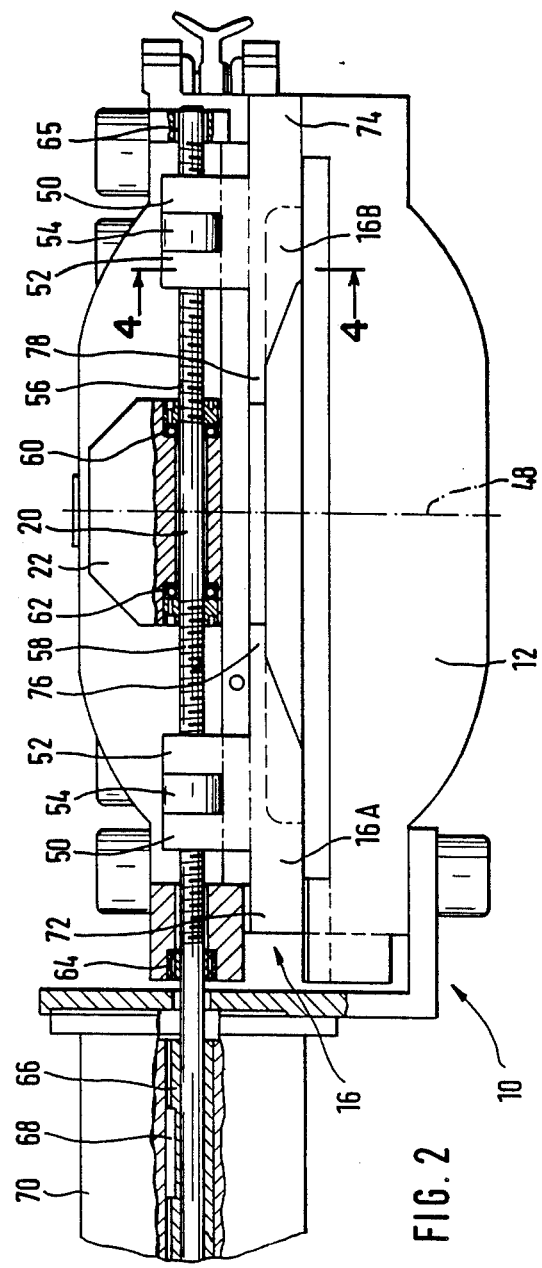
FIG. 2 shows another exemplary embodiment of an inventive injector head without a coextruder and after the injector head end member has been pivoted away.

FIG. 2 shows the construction and arrangement of the inventive side plates 16. The side plates 16a and 16b are disposed across from one another, are symmetrical relative to the central extrusion axis 48, and are each provided with two spaced-apart guide pins 50 and 52, each of which is in the form of a U. Respective adjustment members 54 are provided that are in threaded engagement with the threaded spindle 20 and guide the side plates 16 via the guide pins 52 and 50. In so doing, with small tolerances the dimensions of the adjustment members 54 respectively correspond to the open width between the guide pins 52 and 50, so that the side plates 16 can still be manually removed from the adjustment members 54, yet the exactness of the guidance is assured. The detailed configuration of the guide pins 52 and 50 can also be seen from FIG. 4.

The threaded spindle 20 is provided with oppositely directed trapezoidal threads 56 and 58, with each adjustment member 54 meshing with each of the trapezoidal threads 56 and 58. Provided in the mounting block 22 are thrust bearings 60 and 62 that are disposed remote from one another and axially and radially support the threaded spindle 20. In addition, respective radial bearings 64 and 65 are provided on the outer ends of the threaded spindle 20. Beyond the radial bearings 64, the threaded spindle is extended and is surrounded by a sleeve 66, which engages a servo-motor 70 via a tongue and groove joint 68.

Upon actuation of the servo-motor 70, the side plates 16 move symmetrically toward or away from one another, with the respective narrowest or widest end positions being prescribed by the tread strip width, in conformity with requirements, or by the corresponding lengths of the trapezoidal threads 58 and 56 that conform to the tread strip width. Even in the narrowest position of the side plates 16, outer end regions 72 and 74 each still overlap the slide surface 32 on the injector head end member 28, or guide surfaces on the injector head body 12, whereas the inner upper end regions 76 and 78 of the side plates 16 are still overlapped by the thickness-adjusting slide means 18 (not shown in FIG. 2), even in the outermost end position.

Figure 3:
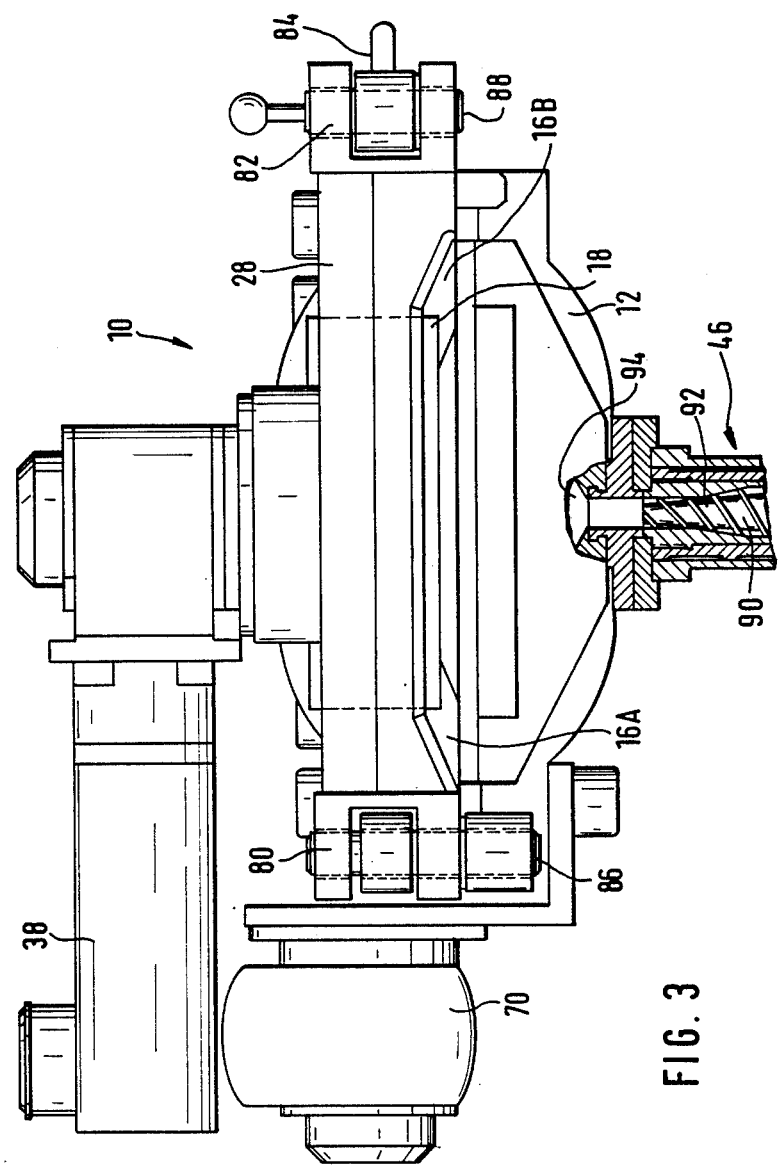
FIG. 3 is a view of an inventive extruder injector head with a partially broken away coextruder.

FIG. 3 shows the arrangement of the swivel member in front of the injector head body 12. The injector head end member 28 is mounted on the body 12 via a relatively strong joint or hinge 80. Mounted on the opposite side via a further joint or hinge 82 is a locking mechanism 84 with which the injector head end member 28 is fixed in such a way that it rests fully against the injector head body 12. Each of the hinges 80 and 82 is provided with a joint pin 86 and 88 that is precisely mounted in roller bearings. The injector head end member 28 is furthermore provided with a trapezoidal opening that is provided on the bottom edge of the injector head end member 28 and corresponds to the maximum tread strip profile size that is to be produced. In operation, this opening is then covered partially by the thickness-adjusting slide means 18 and partially by the side plates 16a and 16b.

The coextruder 46 for underspraying carrier rubber is provided with an extruder worm 90 that can have any suitable desired construction. However, particularly advantageous is a construction with a central compaction region 92, as shown in FIG. 3. Adjoining the extruder worm 90 is then a double conical region 94 that distributes the carrier rubber over the entire width of the tread strip.

Figure 4:
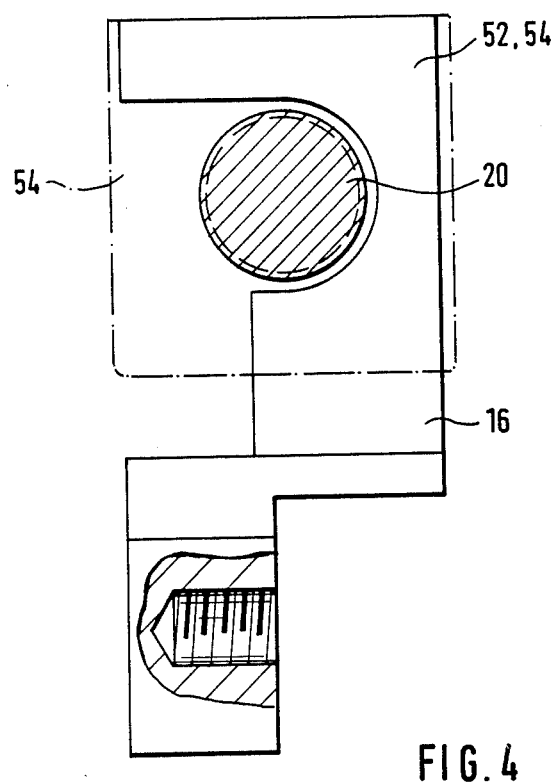
FIG. 4 is a cross-sectional view through an inventive side plate taken along the line 4—4 in FIG. 2.

FIG. 4 shows the cross-sectional configuration of a side plate 16. The guide pins 52 and 50 extend about the threaded spindle 20 in such a way that they can be removed from the spindle toward the front, i.e. in a direction toward the right in FIG. 4. In this way, an optimum guidance at the adjustment member 54, which is indicated by dashed lines, is obtained, because a large abutment surface is available between the adjustment member 54 and the guide pins 52 and 50, whereby nonetheless the side plates 16 can be easily removed and exchanged.

The time needed for exchanging side plates is altogether only about one minute. However, it should be noted that these guide plates rarely need to be replaced or exchanged, since due to the adjustment possibility, a large number of tread strip profiles can be produced with one and the same side plates.

To further increase the extrusion precision, it is proposed to provide a pick-up mechanism on the outlet side of the injector head, especially below the end member 28 thereof. This can include a wheel with which the extruded length of the tread strip can be fixed. In this connection, it is advantageous to simultaneously pivotably mount the wheel and to use it as a measuring device for the tread strip thickness For this purpose, an angle-sensing device is connected with the wheel; the thickness-adjusting slide means 18 is adjusted via a control circuit in such a way that with this control loop, an adaptation of the actual value to the set intended value is undertaken.

With these measures, the extrusion tolerance can be reduced further, which is especially important if the rubber mixtures that are used have different rheological properties within one and the same charge or from charge to charge, or if a blend is used. With these measures, the tolerance can then be reduced to ±0.2 mm.

To simplify operation or handling, it is furthermore possible, in place of adjustment of the intended value to use a set-value data bank or read-only-memory in which different profiles are programmed, so that the operator need merely recall the correspondingly desired profile by selecting a program number, thus obtaining the required tread strip width, thickness, and length, whereby the provided shrinkage factors can also be taken into consideration.

By using an appropriate control device, it is also possible to program the number of desired tread strips and, while the previous size is still being produced, to already preprogram the subsequent tire size, thereby optimizing the throughput of the unit.

It is to be understood that the present invention is not to be limited to the extrusion of only the type of tread strips described. Rather, in addition to unfinished tread strips, blanks of generally rectangular cross-sectional configuration that serve to produce so-called pre-vulcanized tread strips can also be extruded.

The present invention is, of course, in no way restricted to the specific disclosure of the specification and drawings, but also encompasses any modifications within the scope of the appended claims.

What we claim is:

1. In an injector head for producing extruded tread strips for tires, including a thickness-adjusting slide means and two side plates to form an essentially extruded trapezoidal tread strip profile, the improvement comprising:
   means for mounting said side plates in such a way that said side plates are adjustable in a lateral direction, at right angles to a direction of extrusion, and are supported against said thickness-adjusting slide means in a direction parallel to said direction of extrusion, with said thickness-adjusting slide means, on a short side of said trapezoid, extending over the entire tread strip width; and
   an end member that is mounted on said injector head in such a way that it can swivel, one of said thickness-adjusting slide means and said two side parts being mounted on said end member.

2. An injector head according to claim 1, in which said thickness-adjusting slide means has a working edge having a mid-section, and said side plates have respective end regions that extend toward the mid-section and one another, with said working edge and said end regions overlapping one another in all operating states within adjustment displacements of said thickness-adjusting slide means and said slide plates.

3. An injector head according to claim 1, which includes adjustment members for guiding said side plates in a lateral direction, with said side plates being removable from said adjustment members after said end member has been swivelled away therefrom.

4. An injector head according to claim 1, in which said thickness-adjusting slide means is of one-piece construction, is mounted in said end member, and is provided, for said side plates, with a slide surface that faces opposite to said direction of extrusion.

5. An injector head according to claim 2, in which said thickness-adjusting slide means is provided with an exchangeable guide facing, said guide facing forming said working edge.

6. An injector head according to claim 1, which includes a threaded spindle that has oppositely directed thread portions and adjustment members for guiding said side plates.

7. An injector head according to claim 6, which includes thrust bearings, which also provide support in an axial direction, for supporting said threaded spindle between said oppositely directed thread portions thereof; said injector head further including radial bearings for supporting said threaded spindle beyond said oppositely directed thread portions thereof.

8. An injector head according to claim 6, which includes: a servo-motor for driving said threaded spindle; a sleeve that extends about a laterally outer portion of said spindle; and a tongue and groove joint for providing meshing engagement between said sleeve and said motor.

9. An injector head according to claim 1, which includes a threaded spindle, and in which said thickness-adjusting slide means is provided with thread means, with which said threaded spindle meshes.

10. An injector head according to claim 9, which includes a mounting block that is provided with thrust bearings, which also provide support in an axial direction, for guiding said threaded spindle.

11. An injector head according to claim 9, which includes a sleeve that extends about an upper portion of said threaded spindle, and a tongue and groove joint for connecting said sleeve to a servo-motor.

12. An injector head according to claim 1, which includes a coextruder connected to a longer side of said trapezoid, opposite said thickness-adjusting slide means.

13. An injector head according to claim 12, in which said coextruder has a mouth disposed downstream of working edges of said side plates and upstream of a working edge of said thickness-adjusting slide means.

14. An injector head according to claim 1, in which said side plates are laterally supported on a support surface of said end member, with a guide surface being provided for said side plates on a portion of said injector head that faces said end member and that is overlapped by said side plates.

15. An injector head according to claim 1, which includes detection means for detecting at least one of the length and thickness of an extruded tread strip.

16. An injector head according to claim 15, in which said detection means is coupled to a control circuit that is connected to said thickness-adjusting slide means.

* * * * *

UNITED STATES PATENT AND TRADEMARK OFFICE
CERTIFICATE OF CORRECTION

PATENT NO.  : 4,944,666
DATED       : 31 July 1990
INVENTOR(S) : RAINER HILKE ET AL It is certified that error appears in the above-identified patent and that said Letters Patent is hereby corrected as shown below:

On the title-abstract page, please correct the spelling of the Assignee company as follows:

[73] A-Z Formen- und Maschinenbau GmbH,
     Munich, Fed. Rep. of Germany

Signed and Sealed this

Sixth Day of November, 1990

*Attest:*

HARRY F. MANBECK, JR.

*Attesting Officer*  *Commissioner of Patents and Trademarks*